US012462970B2

(12) United States Patent
Okuzawa et al.

(10) Patent No.: US 12,462,970 B2
(45) Date of Patent: Nov. 4, 2025

(54) COIL COMPONENT

(71) Applicant: TDK Corporation, Tokyo (JP)

(72) Inventors: Nobuyuki Okuzawa, Tokyo (JP); Kazuhiko Ito, Tokyo (JP); Munehiro Takaku, Tokyo (JP); Junichiro Urabe, Tokyo (JP)

(73) Assignee: TDK Corporation, Tokyo (JP)

( * ) Notice: Subject to any disclaimer, the term of this patent is extended or adjusted under 35 U.S.C. 154(b) by 944 days.

(21) Appl. No.: 17/504,315

(22) Filed: Oct. 18, 2021

(65) Prior Publication Data

US 2022/0130601 A1 Apr. 28, 2022

(30) Foreign Application Priority Data

Oct. 22, 2020 (JP) ................................ 2020-177158

(51) Int. Cl.
*H01F 27/29* (2006.01)
*H01F 27/32* (2006.01)

(52) U.S. Cl.
CPC ......... *H01F 27/327* (2013.01); *H01F 27/292* (2013.01)

(58) Field of Classification Search
CPC .................................................... H01F 27/327
USPC ........................................................ 336/192
See application file for complete search history.

(56) References Cited

U.S. PATENT DOCUMENTS

| | | | | |
|---|---|---|---|---|
| 2002/0009577 A1* | 1/2002 | Takaya | H03H 7/0115 428/209 |
| 2004/0183645 A1* | 9/2004 | Takaya | H01F 41/041 336/234 |
| 2018/0096778 A1 | 4/2018 | Yatabe et al. | |
| 2019/0198232 A1 | 6/2019 | Sato et al. | |
| 2020/0286665 A1 | 9/2020 | Hirukawa | |

FOREIGN PATENT DOCUMENTS

| | | | |
|---|---|---|---|
| EP | 1443529 A1 | 8/2004 |
| JP | 2003-197427 A | 7/2003 |
| JP | 2006-324489 A | 11/2006 |
| JP | 2008-198923 A | 8/2008 |
| JP | 2015-103723 A | 6/2015 |

* cited by examiner

*Primary Examiner* — Ronald Hinson
(74) *Attorney, Agent, or Firm* — Rimon P.C.

(57) ABSTRACT

Disclosed herein is a coil component that includes a resin body having a first resin-based insulating material and a second resin-based insulating material lower in relative permittivity than the first resin-based insulating material, a coil pattern embedded in the resin body and helically wound in a plurality of turns, and first and second terminal electrodes formed on a surface of the resin body and connected respectively to one and other ends of the coil pattern. The coil pattern has a part covered with the first resin-based insulating material and another part covered with the second resin-based insulating material.

10 Claims, 12 Drawing Sheets

COIL COMPONENT

BACKGROUND OF THE INVENTION

Field of the Invention

The present invention relates to a coil component and, more particularly, to a coil component having a structure in which a helical coil pattern is embedded in a resin body.

Description of Related Art

As a coil component having a structure in which a helical coil pattern is embedded in a resin body, a coil component described in JP 2006-324489A is known.

However, in the coil component described in JP 2006-324489A, it is difficult to sufficiently increase a self-resonance frequency (SRF).

SUMMARY

It is therefore an object of the present invention to increase a self-resonance frequency in a coli component having a structure in which a helical coil pattern is embedded in a resin body.

A coil component according to the present invention includes: a resin body having a first resin-based insulating material and a second resin-based insulating material lower in relative permittivity than the first resin-based insulating material; a coil pattern embedded in the resin body and helically wound in a plurality of turns; and first and second terminal electrodes formed on the surface of the resin body and connected respectively to one and the other ends of the coil pattern. The coil pattern has a part covered with the first resin-based insulating material and another part covered with the second resin-based insulating material.

According to the present invention, sufficient mechanical strength can be ensured by the first resin-based insulating material, and floating capacitance can be reduced by the second resin-based insulating material low in relative permittivity. This can increase a self-resonance frequency.

In the present invention, the second resin-based insulating material may be provided between the first and second terminal electrodes and the coil pattern. This can reduce the floating capacitance between the first and second terminal electrodes and the coil pattern.

In the present invention, the second resin-based insulating material may be provided between adjacent turns of the coil pattern. This can reduce the floating capacitance generated between adjacent turns of the coil pattern.

In the present invention, the resin body may include a first resin layer, a second resin layer, and a third resin layer provided between the first and second resin layers, the coil pattern may include a plurality of first horizontal sections provided on the first resin layer and embedded in the third resin layer, a plurality of second horizontal sections provided on the third resin layer and embedded in the second resin layer, a plurality of first vertical sections penetrating the third resin layer and connecting each of one ends of the plurality of first horizontal sections to each of one ends of the plurality of second horizontal sections, and a plurality of second vertical sections penetrating the third resin layer and connecting each of the other ends of the plurality of first horizontal sections to each of other ends of the plurality of second horizontal sections. With this configuration, the coil axis of the coil pattern can be made perpendicular to the stacking direction of the resin layers.

In this case, the first and second terminal electrodes are provided on the second resin layer, wherein the second resin layer may be made of the second resin-based insulating material, and wherein a part of the third resin layer that embeds the first horizontal section therein may be made of the second resin-based insulating material, while the remaining part thereof may be made of the first resin-based insulating material. In the former case, the floating capacitance generated between the first and second terminal electrodes and the second horizontal sections of the coil pattern and the floating capacitance generated between adjacent second horizontal sections can be reduced. In the latter case, the floating capacitance between adjacent first horizontal sections can be reduced.

In the present invention, the first and second terminal electrodes may be arranged in the axial direction of the coil pattern. This reduces a potential difference between the first and second terminal electrodes and the coil pattern, thereby further reducing floating capacitance.

In this case, the first and second terminal electrodes may be formed on the surface of the resin body parallel to the axial direction without being formed on the surface thereof perpendicular to the axial direction. This makes magnetic flux less likely to interface with the first and second terminal electrodes, thereby suppressing the occurrence of an eddy current.

In the present invention, the first resin-based insulating material may be added with filer, while the second resin-based insulating material is added with no filler. This can further enhance the strength of the first resin-based insulating material and further reduce the relative permittivity of the second resin-based insulating material.

According to the present invention, it is possible to increase the self-resonance frequency in a coli component having a structure in which a helical coil pattern is embedded in a resin body.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a view as viewed from the top surface side, and FIG. 1B is a view as viewed from the mounting surface side;

FIGS. 6A to 11C are process views for explaining the manufacturing method for the coil component 1, where FIGS. 6A, 7A, 8A, 9A, 10A, and 11A are schematic perspective views, FIGS. 6C, 7C, 8C, 9C, 10C, and 11C are schematic cross-sectional views taken along the line B-B in FIGS. 6B, 7B, 8B, 9B, 10B, and 11B, respectively;

FIG. 14A is a view as viewed from the top surface side, and FIG. 14B is a view as viewed from the mounting surface side; FIG. 15A is a view as viewed from the top surface side, and FIG. 15B is a view as viewed from the mounting surface side.

DETAILED DESCRIPTION OF THE EMBODIMENTS

Preferred embodiments of the present disclosure will be explained below in detail with reference to the accompanying drawings.

First Embodiment

Figure 1A:
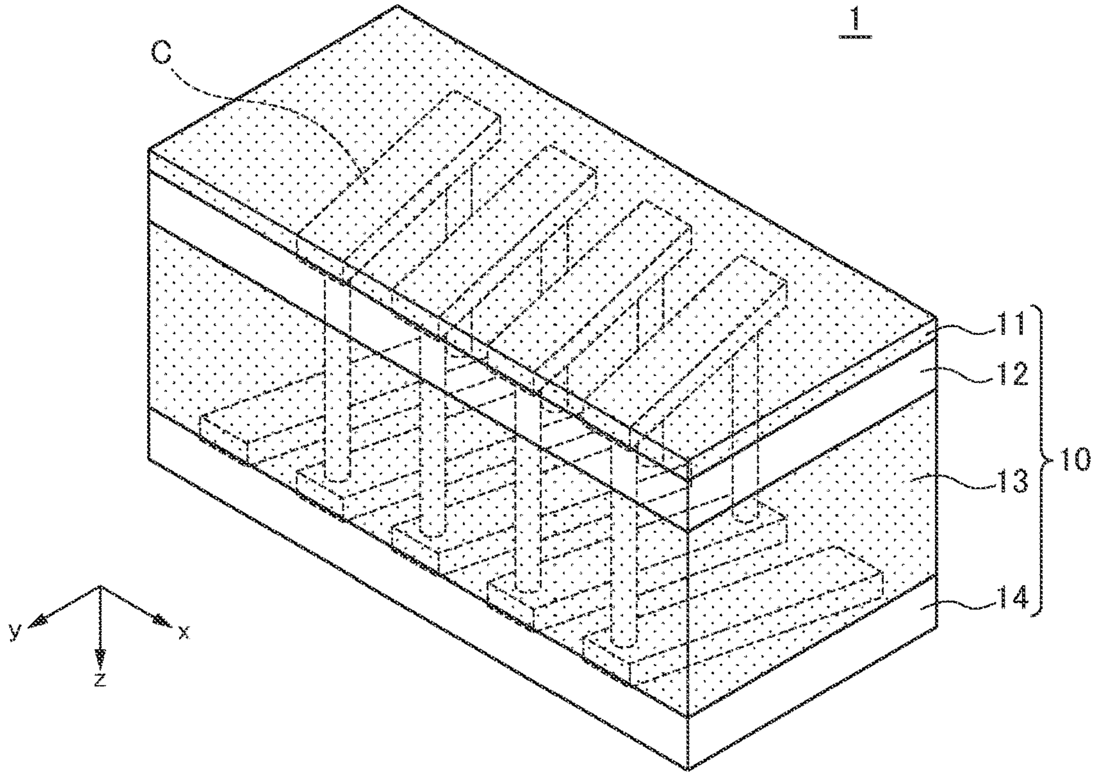
FIGS. 1A and 1B are schematic transparent perspective views for explaining the configuration of a coil component 1 according to a first embodiment of the present invention, where
Figure 1B:
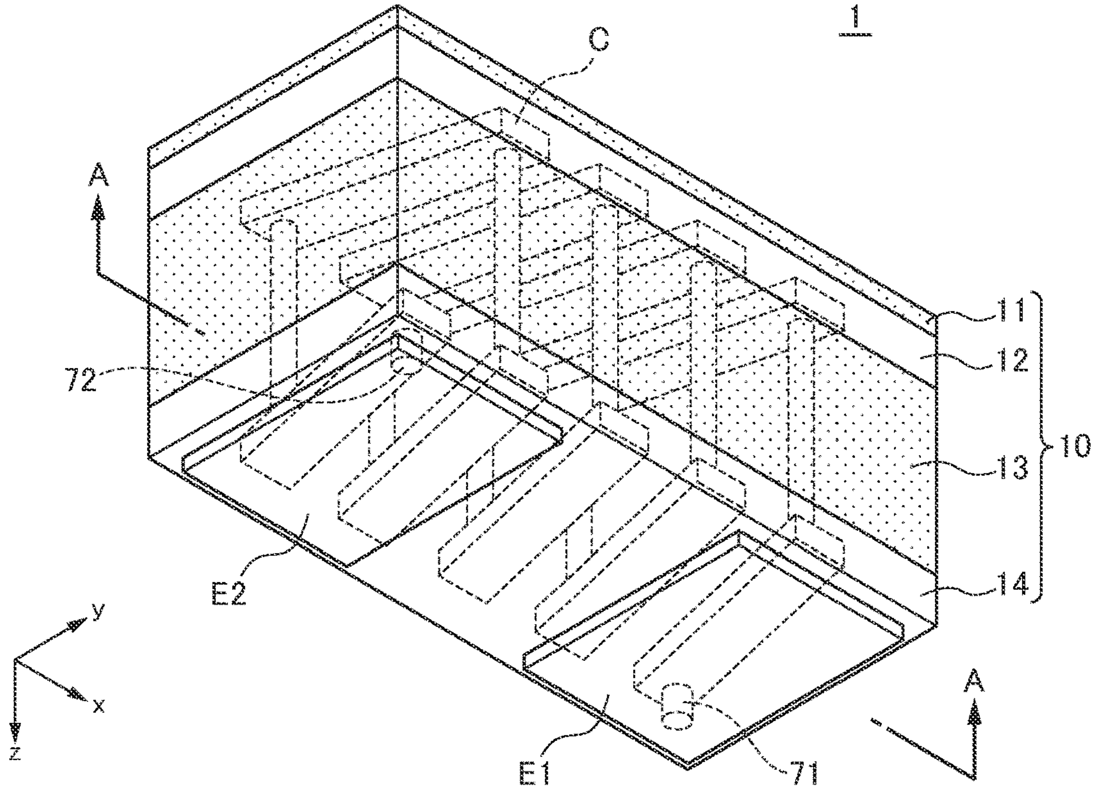
Figure 2:
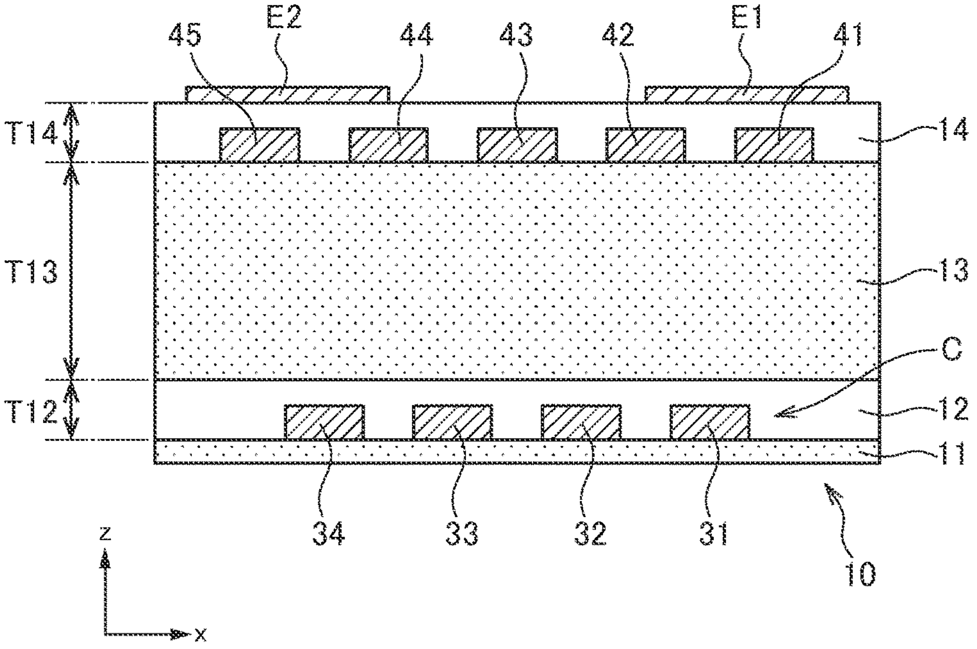
FIG. 2 is a schematic cross-sectional view taken along the line A-A in FIG. 1B.

FIGS. 1A and 1B are schematic transparent perspective views for explaining the configuration of a coil component 1 according to a first embodiment of the present invention. FIG. 1A is a view as viewed from the top surface side, and FIG. 1B is a view as viewed from the mounting surface side. FIG. 2 is a schematic cross-sectional view taken along the line A-A in FIG. 1B.

The coil component 1 according to the first embodiment is a surface-mountable chip-type electronic component and includes, as illustrated in FIGS. 1A, 1B and 2, a resin body 10, a coil pattern C embedded in the resin body 10, and terminal electrodes E1 and E2 provided on the surface of the resin body 10.

The resin body 10 has a structure in which four resin layers 11 to 14 are stacked in this order in the z-direction. The resin layers 11 and 13 are made of a resin-based insulating material obtained by adding filler such as silica to an epoxy- or acrylic-based resin material. The resin-based insulating material constituting the resin layer 11 and that constituting the resin layer 13 may be the same or different. The resin layers 12 and 14 are made of a resin material including no filler, such as bismaleimide or liquid crystal polymer. The resin-based insulating material constituting the resin layer 12 and that constituting the resin layer 14 may be the same or different.

Thus, the resin-based insulating material constituting the resin layers 11 and 13 is higher in strength and processability than that constituting the resin layers 12 and 14. On the other hand, the resin-based insulating material constituting the resin layers 12 and is made of a resin material having a low relative permittivity and is added with no filler such as silica and is thus lower in relative permittivity than the resin-based insulating material constituting the resin layers 11 and 13. For example, the resin-based insulating material constituting the resin layers 11 and 13 has a relative permittivity E of about 3.3 at 1 GHz, and the resin-based insulating material constituting the resin layers 12 and 14 has a relative permittivity E of about 2.4 at 1 GHz.

Figure 3:
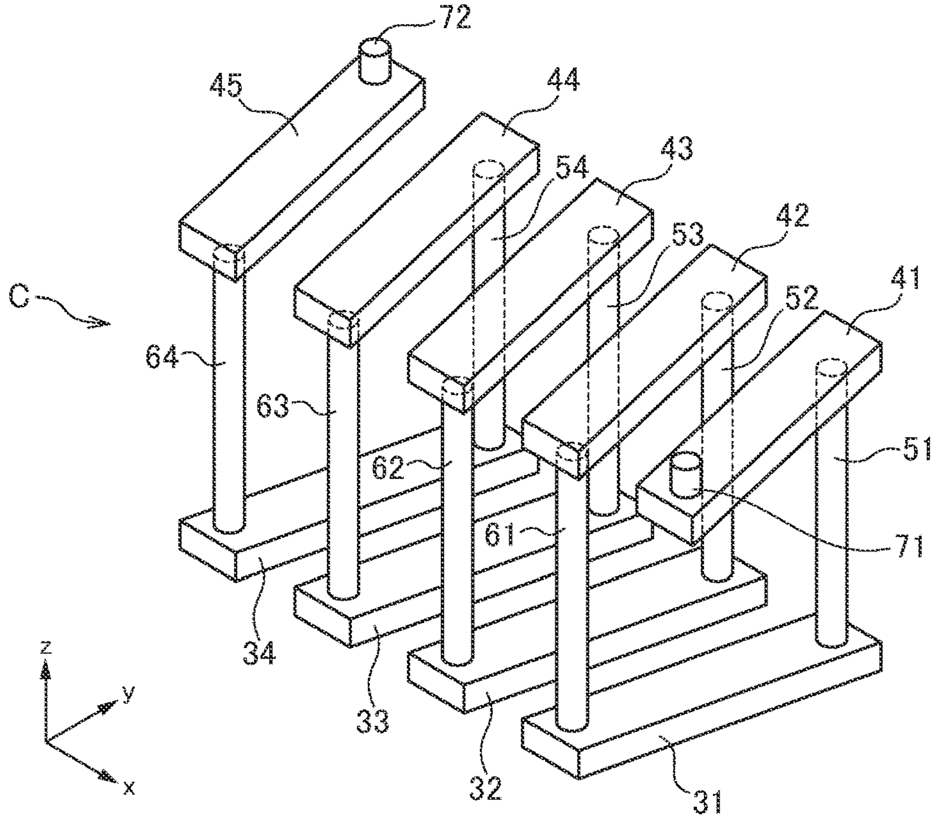
FIG. 3 is a schematic perspective view for explaining the structure of the coil pattern C embedded in the resin body 10.
Figure 4:
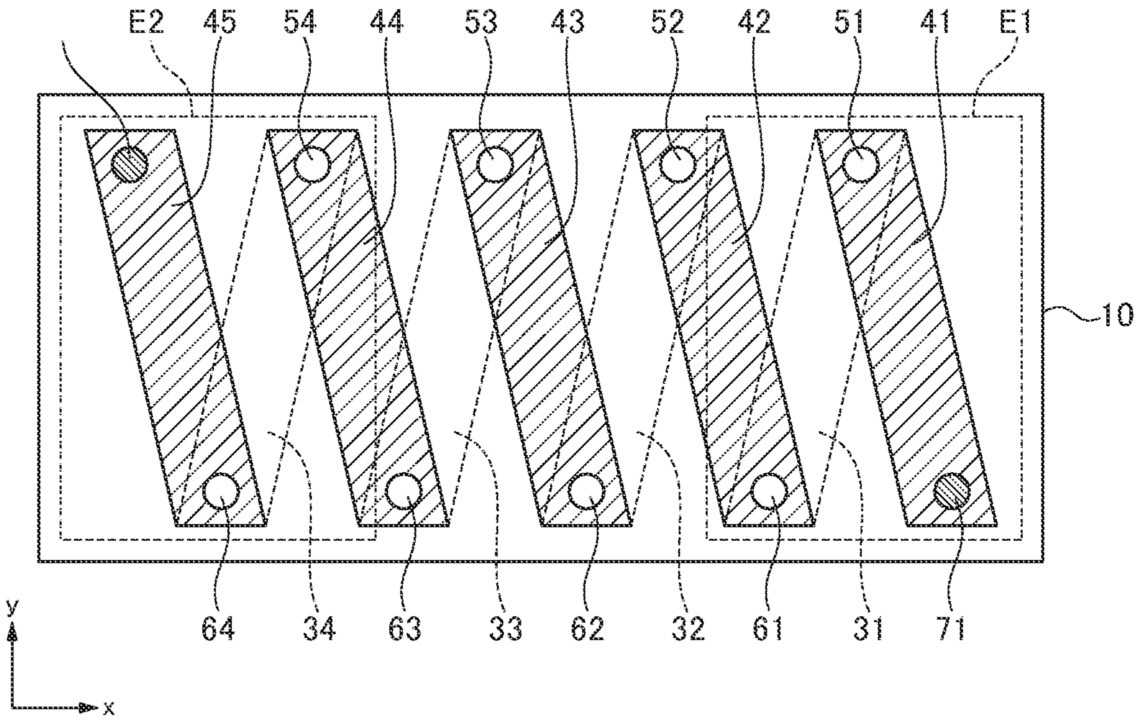
FIG. 4 is a schematic transparent plan view of the coil pattern C as viewed in the z-direction.

FIG. 3 is a schematic perspective view for explaining the structure of the coil pattern C embedded in the resin body 10. FIG. 4 is a schematic transparent plan view of the coil pattern C as viewed in the z-direction.

As illustrated in FIGS. 2 to 4, the coil pattern C includes horizontal sections (first horizontal sections 31 to 34 and second horizontal sections 41 to 45) extending in the xy plane and vertical sections (first vertical sections 51 to 54 and second vertical sections 61 to 64) extending in the z-direction. As illustrated in FIG. 2, the first horizontal sections 31 to 34 are provided on the surface of the resin layer 11 and embedded in the resin layer 12. The second horizontal sections 41 to 45 are provided on the surface of the resin layer 13 and embedded in the resin layer 14. The first vertical sections 51 to 54 and second vertical sections 61 to 64 are each provided so as to penetrate the resin layers 12 and 13. The first vertical sections 51 to 54 connect the first horizontal sections 31 to 34 and second horizontal sections 41 to 44, respectively, at their one ends. The second vertical sections 61 to 64 connect the first horizontal sections 31 to 34 and second horizontal sections 42 to 45, respectively, at their other ends.

With the above configuration, the coil pattern C helically wound in a plurality of turns can be obtained. The coil pattern C has a coil axis extending in the x-direction. The other end of the second horizontal section constitutes one end of the coil pattern C and is connected to the terminal electrode E1 through a via conductor 71 penetrating the resin layer 14. One end of the second horizontal section 45 constitutes the other end of the coil pattern C and is connected to the terminal electrode E2 through a via conductor 72 penetrating the resin layer 14. The terminal electrodes E1 and E2 are each a bottom-surface terminal formed only on the xy surface of the resin body 10. That is, the terminal electrodes E1 and E2 do not cover the yz surface of the resin body 10, so that when the coil component 1 is mounted on a circuit board using a solder, the yz surface of the resin body 10 is not covered with solder fillets. This improves a mounting density. Further, magnetic flux generated from the coil pattern C is made less likely to interfere with the terminal electrodes E1, E2 and solder, making it possible to suppress the occurrence of an eddy current.

As illustrated in FIG. 4, the terminal electrode E1 overlaps at least the second horizontal section 41, and the terminal electrode E2 overlaps at least the second horizontal section 45. Thus, floating capacitance is generated between the terminal electrode E1 and the second horizontal section 41 and between the terminal electrode E2 and the second horizontal section 45. However, in the present embodiment, the resin layer 14 positioned both therebetween is made of a resin-based insulating material having a low relative permittivity, making it possible to reduce the floating capacitance generated between the terminal electrode E1, E2 and the second horizontal sections 41 and 45. In addition, the second horizontal sections 41 to 45 are embedded in the resin layer 14, so that the floating capacitance between the second horizontal sections 41 to 45 adjacent to one another in the x-direction, that is, the floating capacitance generated between adjacent turns of the coil pattern C can be reduced. This makes it possible to prevent a decrease in a self-resonance frequency due to floating capacitance.

Further, in the present embodiment, the terminal electrode E1 also overlaps a part of the second horizontal section 42, and the terminal electrode E2 also overlaps a part of the second horizontal section 44. Thus, floating capacitance is also generated between the terminal electrode E1 and the second horizontal section 42 and between the terminal electrode E2 and the second horizontal section 44. The second horizontal section 42 has a longer wiring distance from the terminal electrode E1 than the second horizontal section 41, so that the floating capacitance of the terminal electrode E1 and second horizontal section 42 per unit area is larger than the floating capacitance of the terminal electrode E1 and second horizontal section 41 per unit area due to influence of a voltage drop. Similarly, the second horizontal section 44 has a longer wiring distance from the terminal electrode E2 than the second horizontal section 45, so that the floating capacitance of the terminal electrode E2 and second horizontal section 44 per unit area is larger than the floating capacitance of the terminal electrode E2 and second horizontal section 45 per unit area due to influence of a voltage drop. When the terminal electrodes E1 and E2 each thus overlap some of the second horizontal sections 41 to 45, the effect of the use of a resin-based insulating material having a low relative permittivity as the material of the resin layer 14 becomes larger.

Further, in the present embodiment, the first horizontal sections 31 to 34 are embedded in the resin layer 12, and the resin layer 12 is made of a resin-based insulating material having a low relative permittivity, so that the floating capacitance between the first horizontal sections 31 to 34 adjacent to one another in the x-direction, that is, the floating capacitance generated between adjacent turns of the coil pattern C can be reduced.

The first vertical sections 51 to 54 and second vertical sections 61 to 64 mostly penetrate the resin layer 13 having high strength, making it possible to ensure sufficient mechanical strength of the entire resin body 10. To ensure mechanical strength of the resin body 10, a thickness T13 of the resin layer 13 is preferably three or more times the thicknesses T12 and T14 of the resin layers 12 and 14. For example, by setting the T12, T13, and T14 to about 20 μm, about 115 μm, and about 30 μm, respectively, it is possible to reduce floating capacitance while ensuring mechanical strength of the resin body 10.

As described above, in the coil component 1 according to the present embodiment, the coil pattern C is embedded in the resin body 10 and is covered with the resin layers 11 and 13 made of a resin-based insulating material having high strength and the resin layers 12 and 14 made of a resin-based insulating material having a low relative permittivity, so that it is possible to prevent a reduction in a self-resonance frequency due to floating capacitance while ensuring mechanical strength of the resin body 10.

Further, in the present embodiment, the terminal electrodes E1 and E2 are arranged in the axial direction (x-direction) of the coil pattern C, so that the terminal electrode E1 does not overlap the second horizontal sections (e.g., second horizontal sections 44 and 45) having a comparatively longer wiring distance therefrom and, similarly, the terminal electrode E2 does not overlap the second horizontal sections (e.g., second horizontal sections 41 and 42) having a comparatively longer wiring distance therefrom. This reduces the difference between a potential between the terminal electrodes E1 and the second horizontal sections 41 and 42 overlapping the terminal electrode E1 and a potential between the terminal electrodes E2 and the second horizontal sections 44 and 45 overlapping the terminal electrode E2, so that it is possible to further reduce floating capacitance as compared with a case where the terminal electrodes E1 and E2 are arranged in the y-direction.

The following describes a manufacturing method for the coil component 1 according to the present embodiment.

FIG. 5 and FIGS. 6A to 11C are process views for explaining the manufacturing method for the coil component 1 according to the present embodiment. FIGS. 6A, 7A, 8A, 9A, 10A, and 11A are schematic perspective views, FIGS. 6B, 7B, 8B, 9B, 10B, and 11B are schematic plan views, and FIGS. 6C, 7C, 8C, 9C, 10C, and 11C are schematic cross-sectional views taken along the line B-B in FIGS. 6B, 7B, 8B, 9B, 10B, and 11B, respectively.

Figure 5:
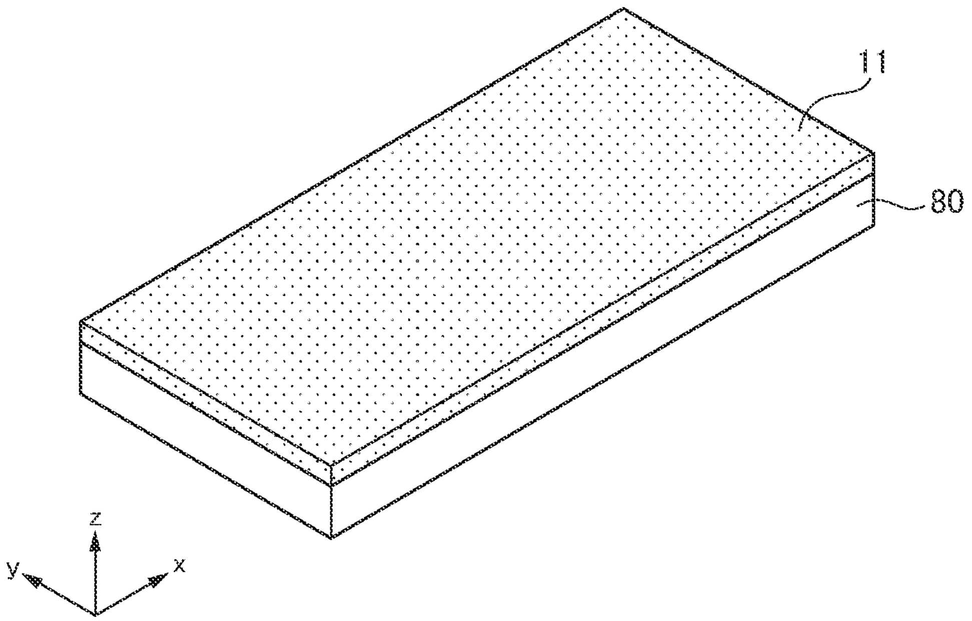
FIG. 5 is a process view for explaining the manufacturing method for the coil component 1.
Figure 6A:
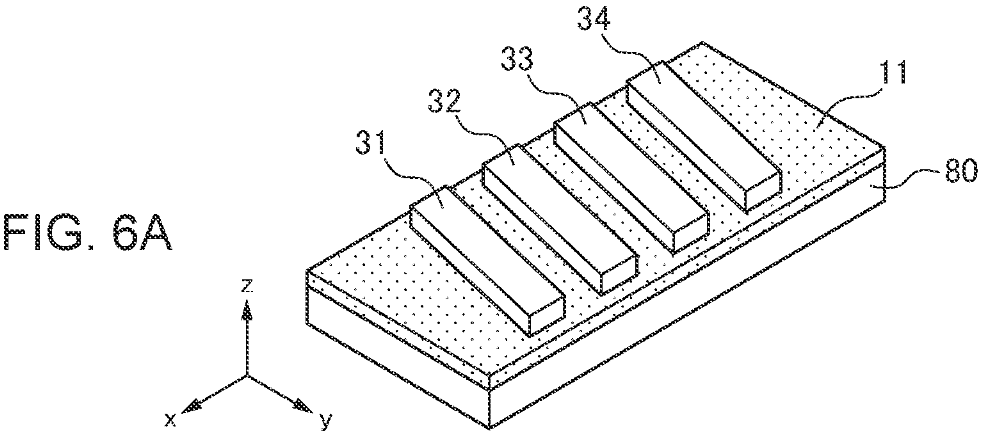
Figure 6B:
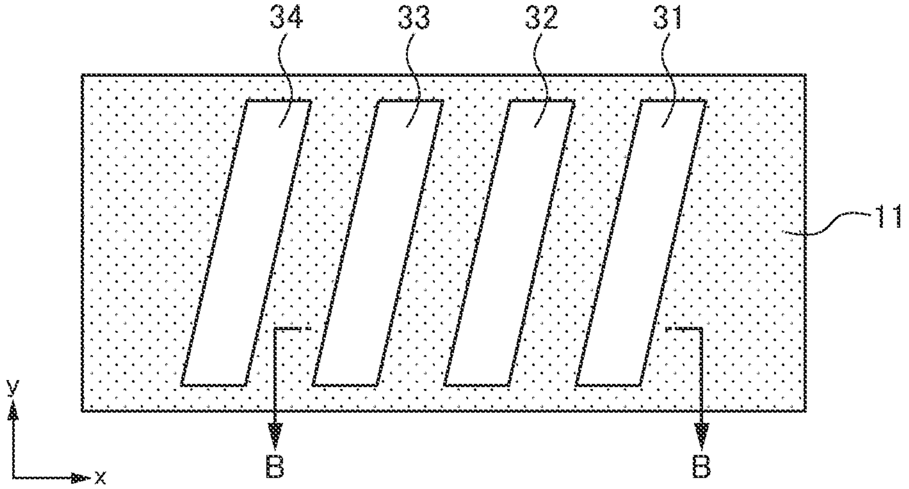
FIGS. 6B, 7B, 8B, 9B, 10B, and 11B are schematic plan views.
Figure 6C:
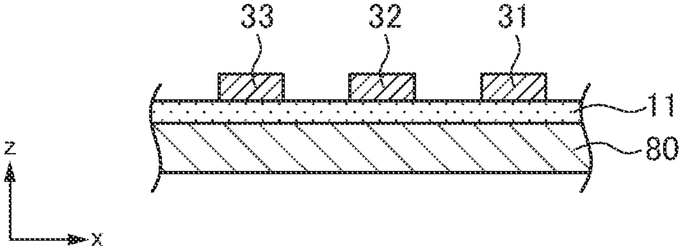

As illustrated in FIG. 5, a support substrate 80 made of a ceramic material such as alumina or non-magnetic ferrite is prepared, and the resin layer 11 is formed on the surface of the support substrate 80. Then, as illustrated in FIGS. 6A to 6C, the first horizontal sections 31 to 34 are formed on the surface of the resin layer 11. The first horizontal sections 31 to 34 are formed as follows: forming a thin feeding film on the entire surface of the resin layer 11; attaching a photosensitive film, followed by exposure and development, to form openings in the photosensitive film; and growing the first horizontal sections 31 to 34 in the respective openings by electrolyte plating. Since the resin layer 11 is made of a resin-based insulating material having high strength, it is possible to ensure high processing accuracy for the first horizontal sections 31 to 34 formed thereon.

Figure 7A:
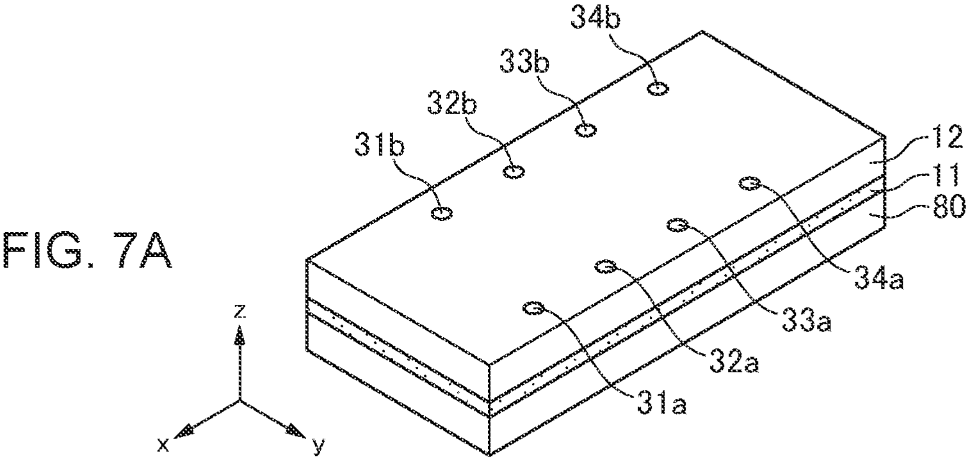
Figure 7B:
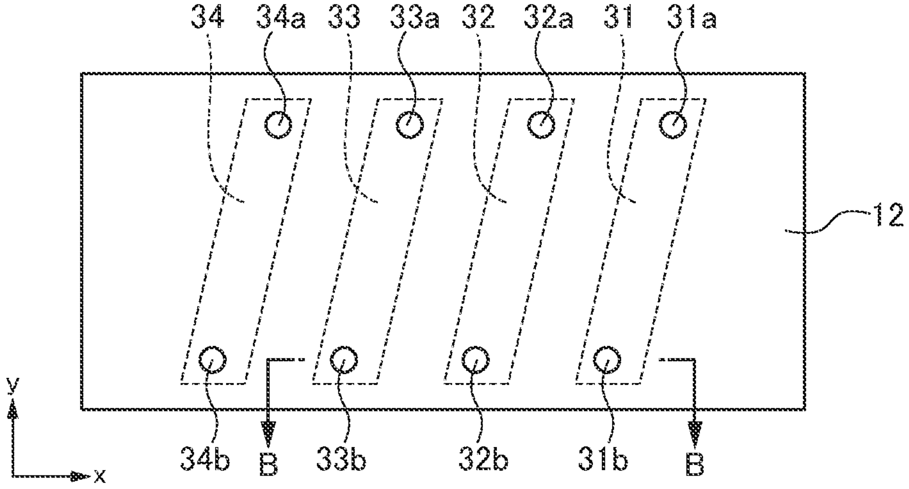
Figure 7C:
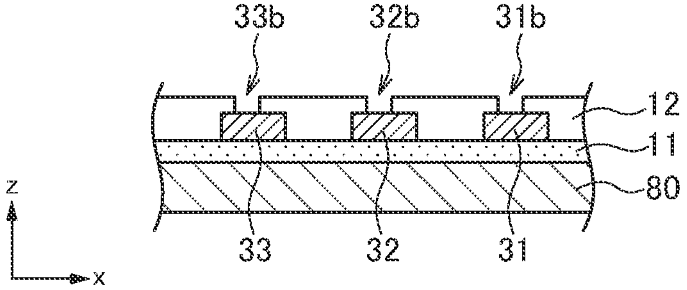

Then, as illustrated in FIGS. 7A to 7C, the resin layer 12 is formed on the surface of the resin layer 11 so as to embed the first horizontal sections 31 to 34 therein. Thus, the first horizontal sections 31 to 34 adjacent to one another in the x-direction are insulated from one another by a resin-based insulating material having a low relative permittivity. Then, openings 31*a* to 34*a* and 31*b* to 34*b* are formed in the resin layer 12 to expose both end portions of the first horizontal sections 31 to 34 therethrough.

Figure 8A:
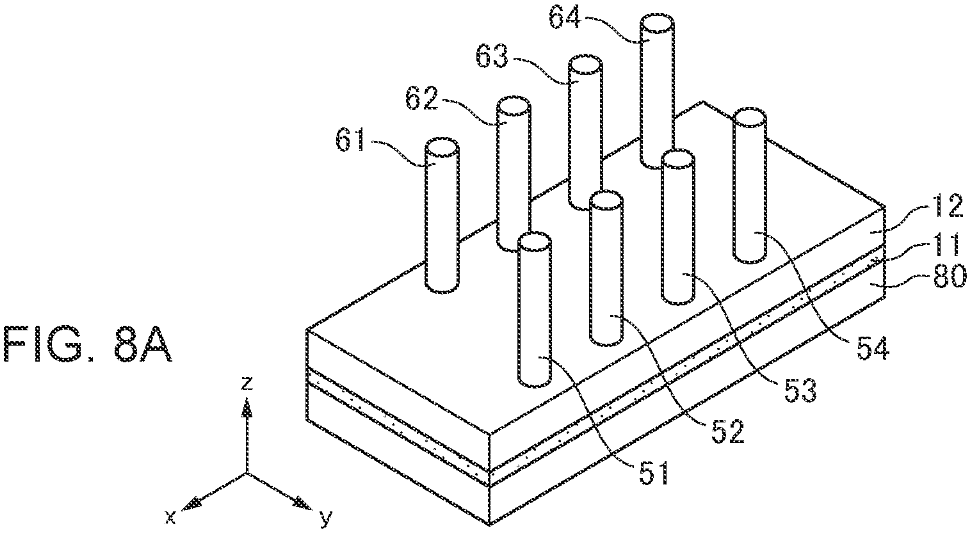
Figure 8B:
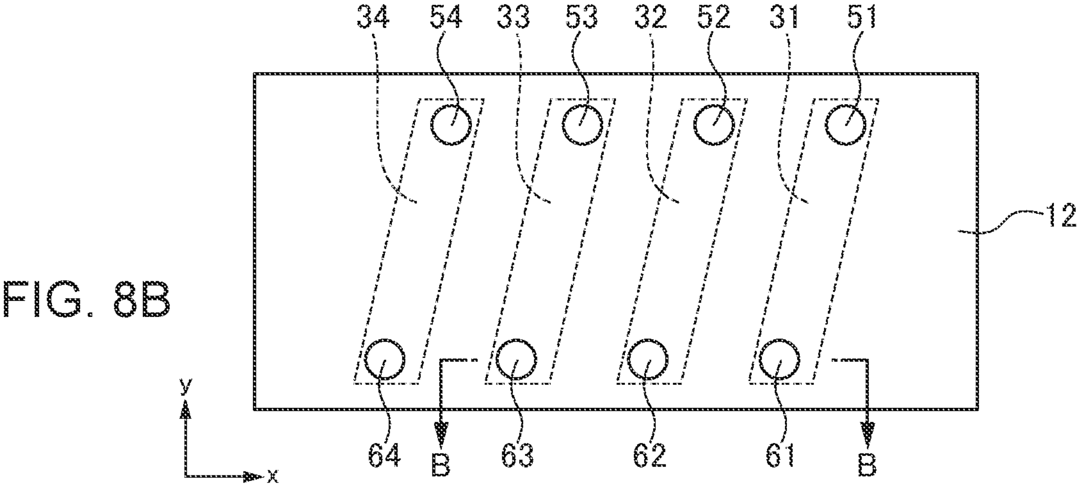
Figure 8C:
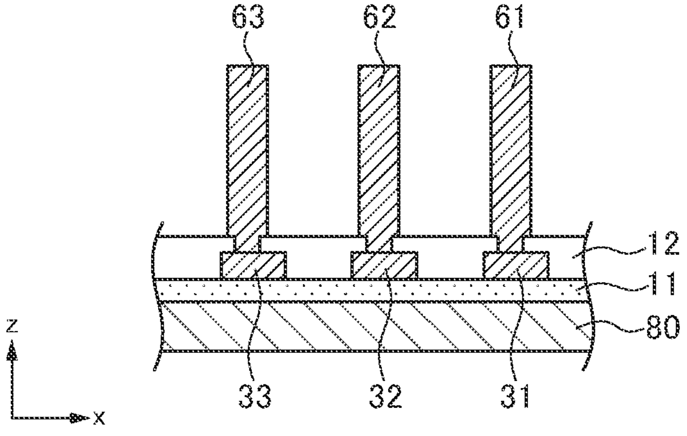

Then, as illustrated in FIGS. 8A to 8C, there are formed the first vertical sections 51 to 54 connected respectively to one ends of the first horizontal sections 31 to 34 through the openings 31*a* to 34*a* and the second vertical sections 61 to 64 connected respectively to the other ends of the first horizontal sections 31 to 34 through the openings 31*b* to 34*b*. The first vertical sections 51 to 54 and second vertical sections 61 to 64 are formed as follows: forming a thin feeding film on the entire surface of the resin layer 12; attaching a photosensitive film, followed by exposure and development, to form openings in the photosensitive film; and growing the first vertical sections 51 to 54 and second vertical sections 61 to 64 in the respective openings by electrolyte plating.

Figure 9A:
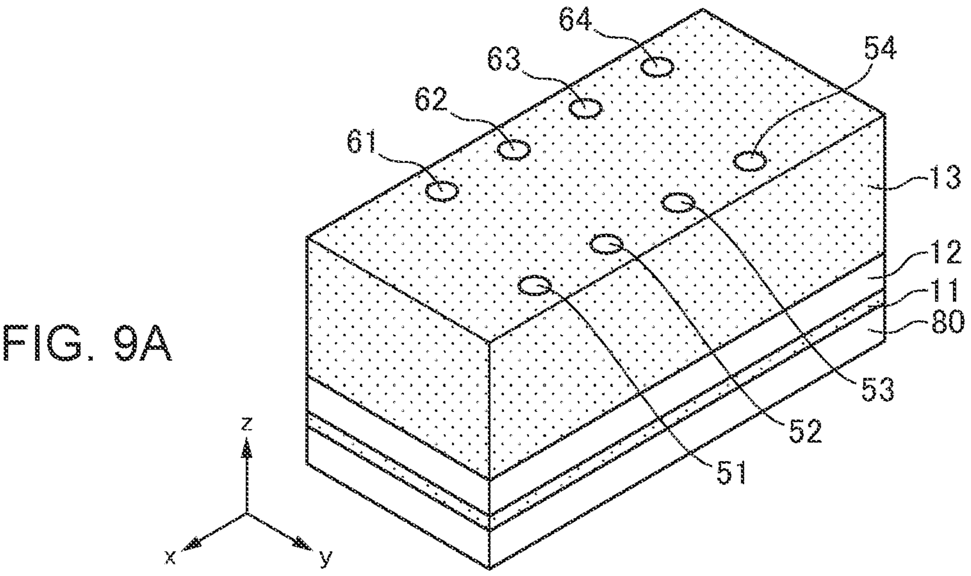
Figure 9B:
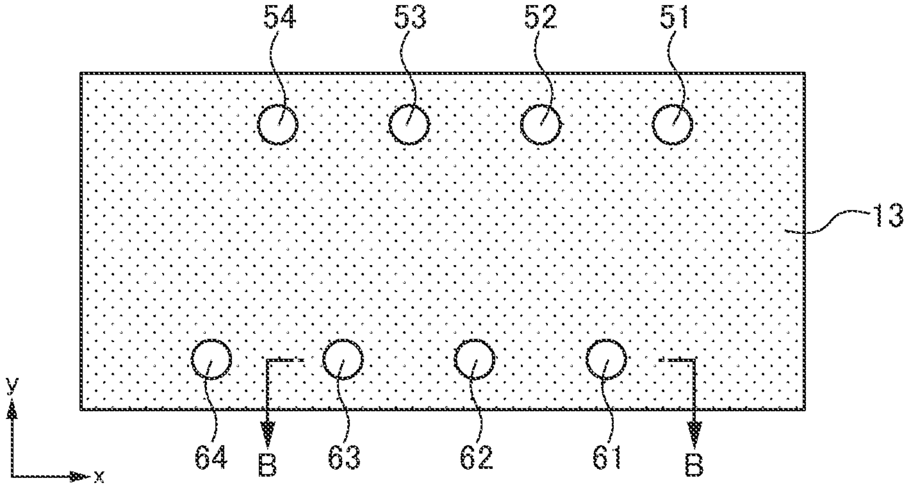
Figure 9C:
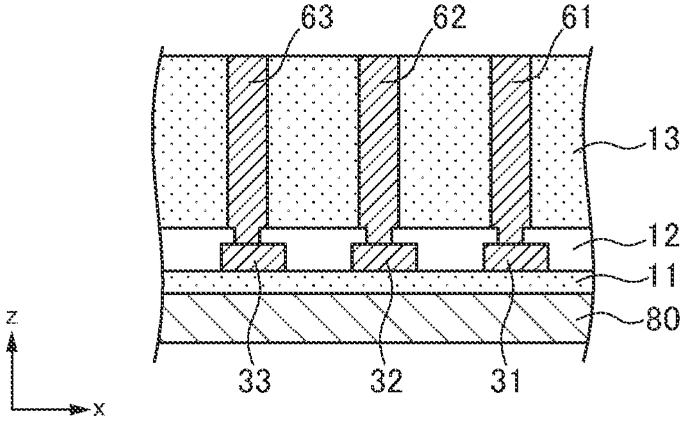

Then, as illustrated in FIGS. 9A to 9C, the resin layer 13 is formed so as to embed the first vertical sections 51 to 54 and second vertical sections 61 to 64 therein. The resin layer 13 is formed as follows: peeling the photosensitive film used for forming the first vertical sections 51 to 54 and second vertical sections 61 to 64; laminating an uncured sheet constituting the resin layer 13 and curing the sheet; and polishing the sheet surface to expose the top portions of the respective first and second vertical sections 51 to 54 and 61 to 64. The processes illustrated in FIGS. 8A to 8C and 9A to 9C may be alternately repeated a plurality of times until a target height of the first vertical sections 51 to 54 and second vertical sections 61 to 64 is achieved. Since the resin layer 13 is made of a resin-based insulating material having high strength, it is possible to ensure high processing accuracy for the first vertical sections 51 to 54 and second vertical sections 61 to 64.

Figure 10A:
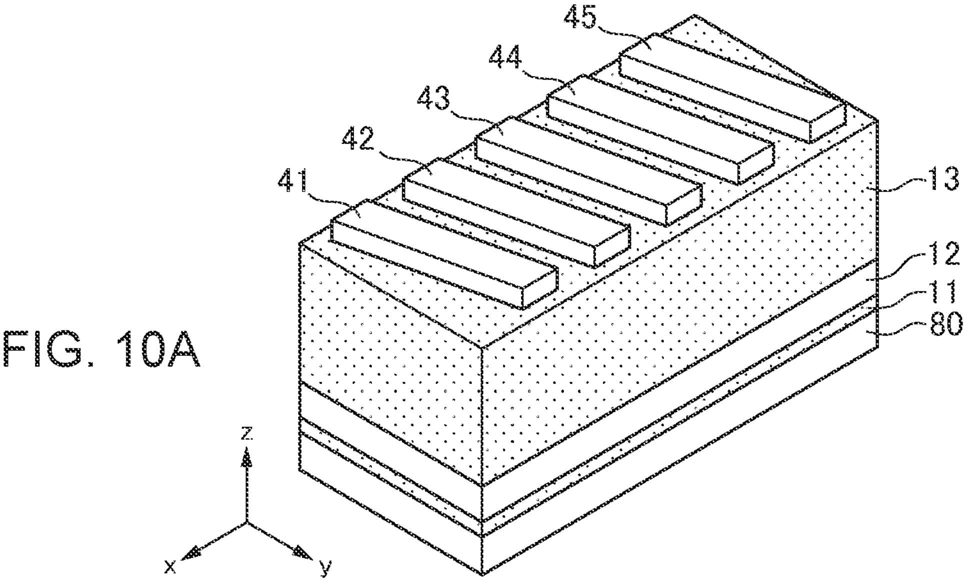
Figure 10B:
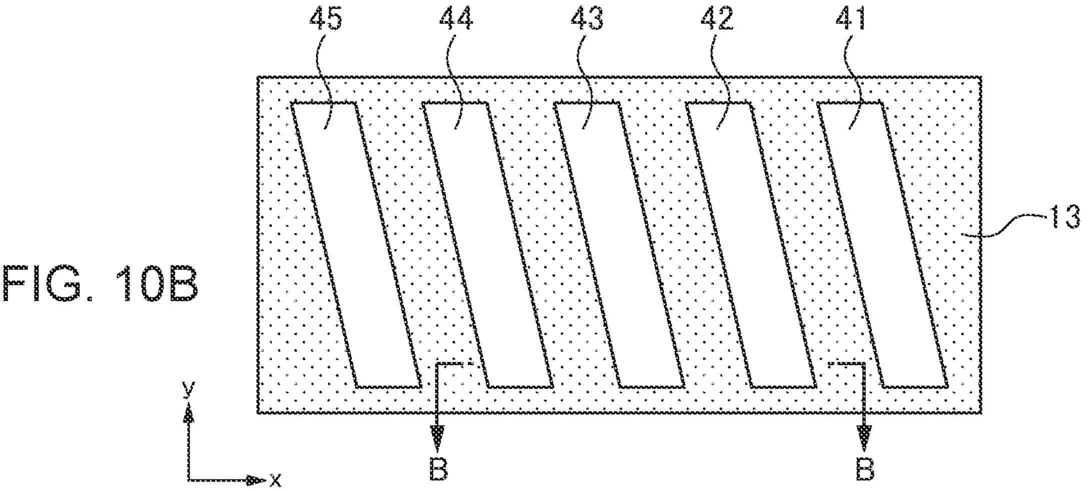
Figure 10C:
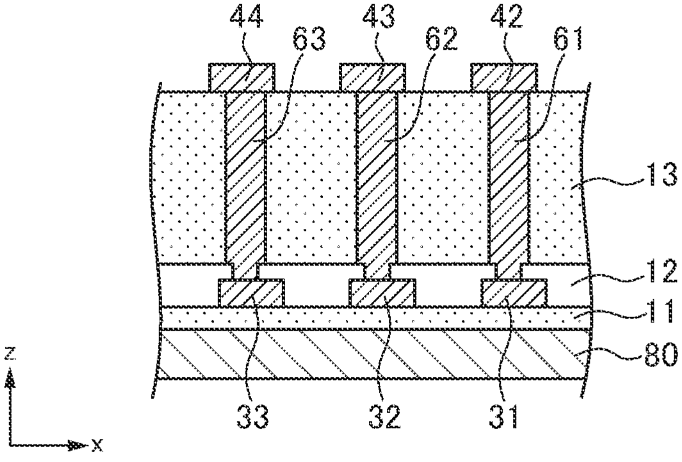

Then, as illustrated in FIGS. 10A to 10C, the second horizontal sections 41 to 45 are formed on the surface of the resin layer 13. The second horizontal sections 41 to 45 may be formed according to the same procedure as for the first horizontal sections 31 to 34. Since the resin layer 13 is made of a resin-based insulating material having high strength, it is possible to ensure high processing accuracy for the second horizontal sections 41 to 45 formed thereon.

Figure 11A:
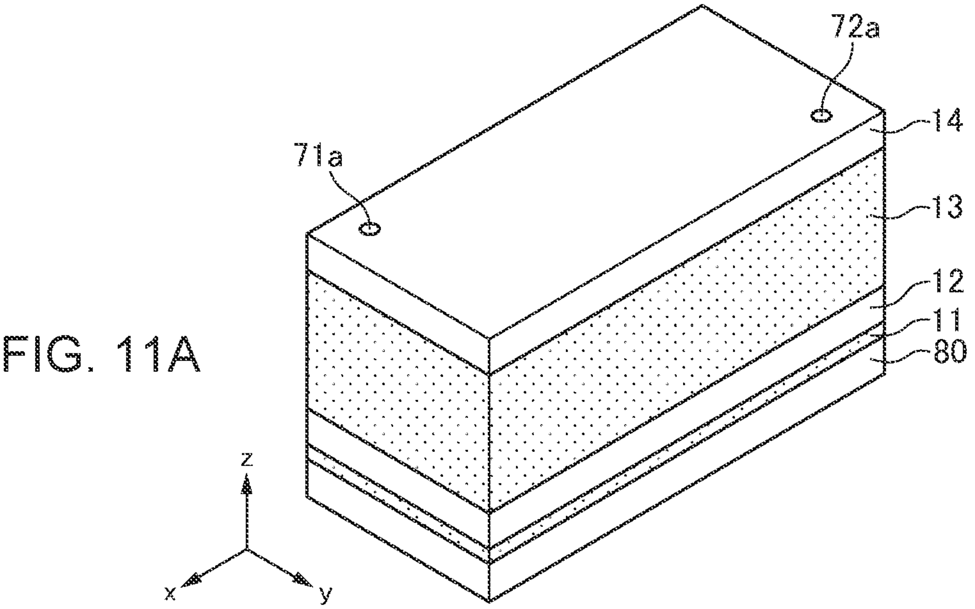
Figure 11B:
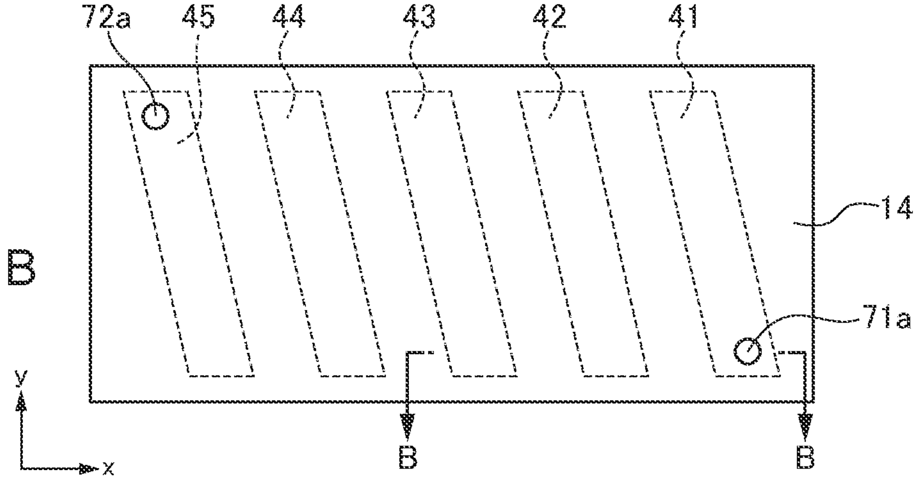
Figure 11C:
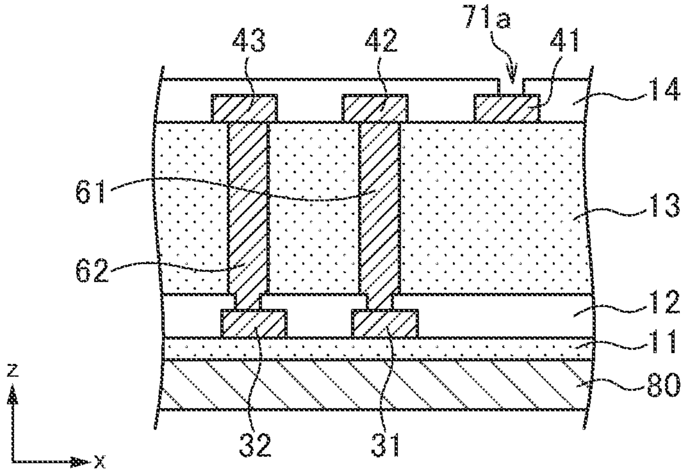

Then, as illustrated in FIGS. 11A to 11C, the resin layer 14 is formed on the surface of the resin layer 13 so as to embed the second horizontal sections 41 to 45 therein. Thus, the second horizontal sections 41 to 45 adjacent to one another in the x-direction are insulated from one another by a resin-based insulating material having a low relative permittivity. Then, openings 71*a* and 72*a* are formed in the resin layer 14 to expose the other end of the second horizontal section 41 and one end of the second horizontal section 45 therethrough. Finally, the terminal electrodes E1 and E2 are formed at positions overlapping the respective openings 71*a* and 72*a*, whereby the coil component 1 according to the present embodiment is completed.

As described above, in the manufacturing method for the coil component 1 according to the present embodiment, the first horizontal sections 31 to 34 and second horizontal sections 41 to 45 are formed respectively on the resin layers 11 and 13 high in strength and processability, and the first vertical sections 51 to 54 and second vertical sections 61 to 64 mostly penetrate the resin layer 13 high in strength and processability. Thus, higher processing accuracy can be ensured as compared with a case where the entire resin body 10 is constituted by a resin-based insulating material having a low relative permittivity.

Second Embodiment

Figure 12:
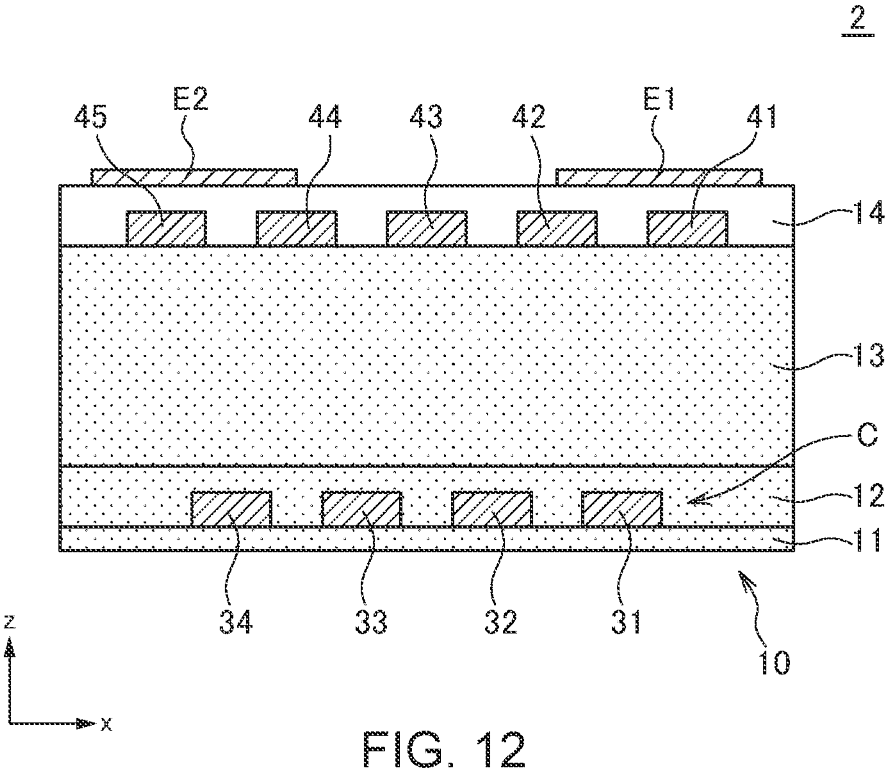
FIG. 12 is a schematic cross-sectional view for explaining the configuration of a coil component 2 according to a second embodiment of the present embodiment.

FIG. 12 is a schematic cross-sectional view for explaining the configuration of a coil component 2 according to a second embodiment of the present embodiment.

As illustrated in FIG. 12, the coil component 2 according to the second embodiment differs from the coil component 1 according to the first embodiment in that the resin layer 12 is made of the same resin-based insulating material as those of the resin layers 11 and 13. Other configurations are the same as those of the coil component 1 according to the first embodiment, so the same reference numerals are given to the same elements, and overlapping description will be omitted. As exemplified by the coil component 2 according to the second embodiment, the first horizontal sections 31 to 34 need not necessarily be covered with a resin-based insulating material having a low relative permittivity in the present invention.

Third Embodiment

Figure 13:
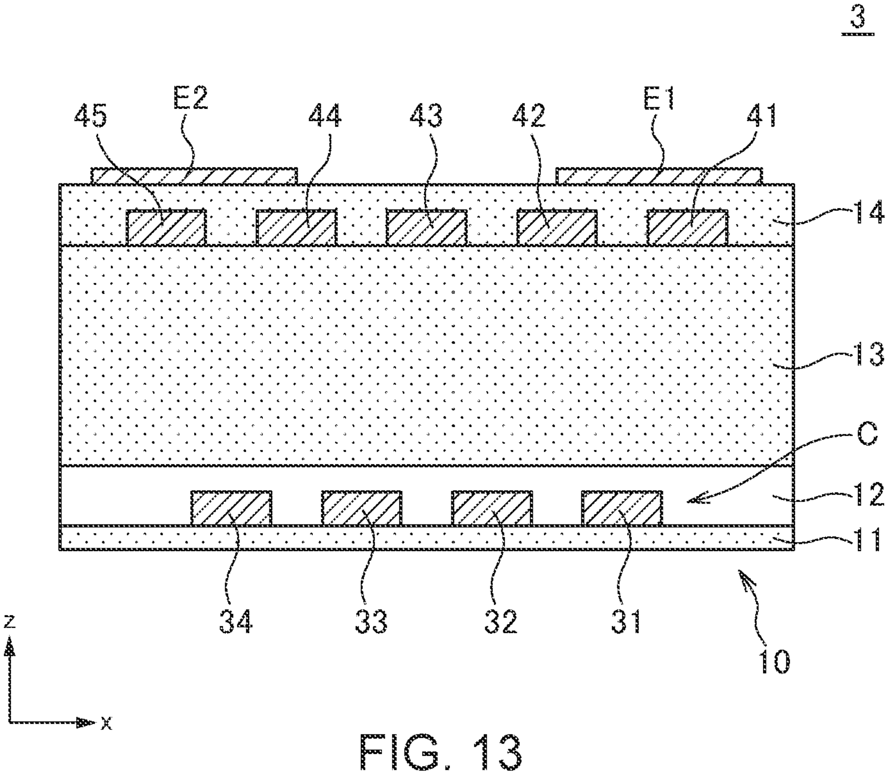
FIG. 13 is a schematic cross-sectional view for explaining the configuration of a coil component 3 according to a third embodiment of the present invention.

FIG. 13 is a schematic cross-sectional view for explaining the configuration of a coil component 3 according to a third embodiment of the present invention.

As illustrated in FIG. 13, the coil component 3 according to the third embodiment differs from the coil component 1 according to the first embodiment in that the resin layer 14 is made of the same resin-based insulating material as those of the resin layers 11 and 13. Other configurations are the same as those of the coil component 1 according to the first embodiment, so the same reference numerals are given to the same elements, and overlapping description will be omitted. As exemplified by the coil component 3 according to the third embodiment, the second horizontal sections 41 to 45 need not necessarily be covered with a resin-based insulating material having a low relative permittivity in the present invention.

Fourth Embodiment

Figure 14A:
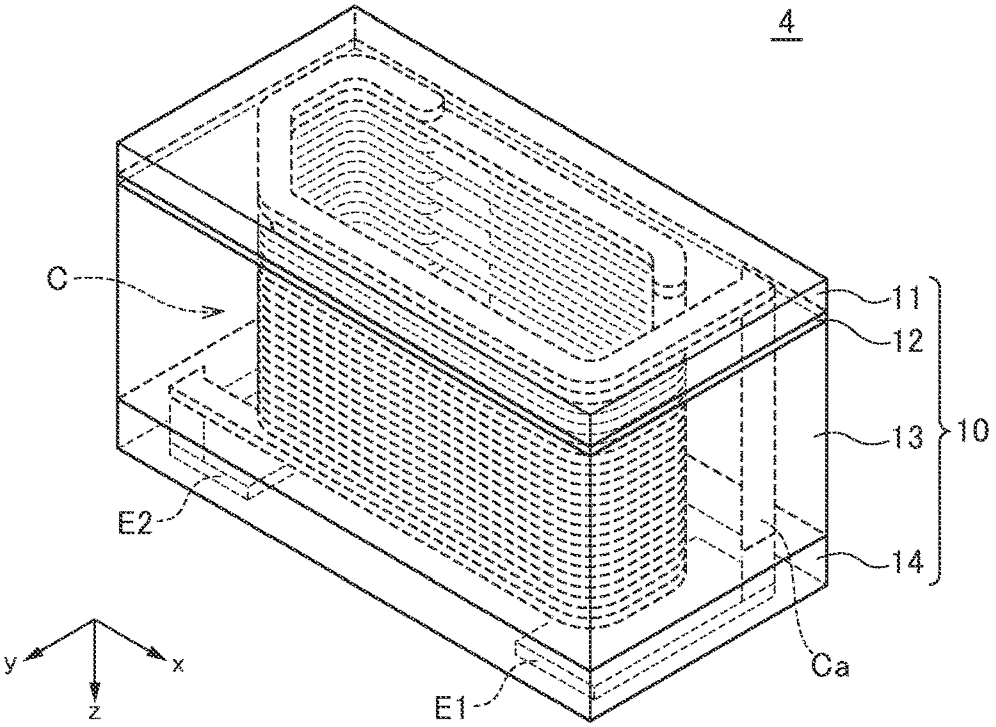
FIGS. 14A and 14B are schematic transparent perspective views for explaining the configuration of a coil component 4 according to a fourth embodiment of the present invention, where
Figure 14B:
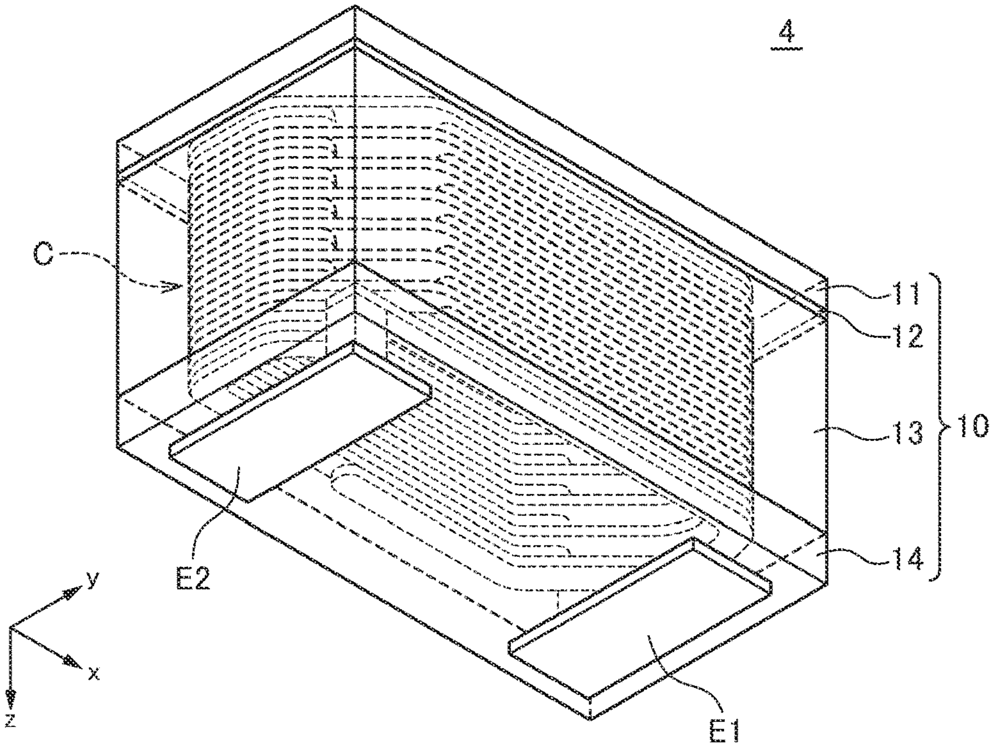

FIGS. 14A and 14B are schematic transparent perspective views for explaining the configuration of a coil component 4 according to a fourth embodiment of the present invention. FIG. 14A is a view as viewed from the top surface side, and FIG. 14B is a view as viewed from the mounting surface side.

As illustrated in FIGS. 14A and 14B, the coil component 4 according to the fourth embodiment differs from the coil component 1 according to the first embodiment in that the coil pattern C embedded in the resin body 10 has a coil axis extending in the z-direction. One end of the coil pattern C is connected to the terminal electrode E1 through a lead-out wiring Ca, and the other end thereof is connected to the terminal electrode E2.

As the material of the resin layer 14 positioned between the terminal electrodes E1, E2 and a first pattern of the coil pattern C starting from the terminal electrode E2, a resin-based insulating material having a low relative permittivity is used. The coil pattern C is mostly embedded in the resin layer 13 having high strength. Further, the resin layer 12 positioned between predetermined adjacent turns of the coil pattern C is also made of a resin-based insulating material having a relative permittivity lower than that of the resin layer 13. This makes it possible to reduce the floating capacitance generated between the terminal electrodes E1, E2 and the first turn of the coil pattern C and the floating capacitance generated between predetermined adjacent turns of the coil pattern C.

As exemplified by the coil component 4 according to the fourth embodiment, the coil pattern C may have a coil axis extending in the stacking direction (z-direction) in the present invention.

Fifth Embodiment

Figure 15A:
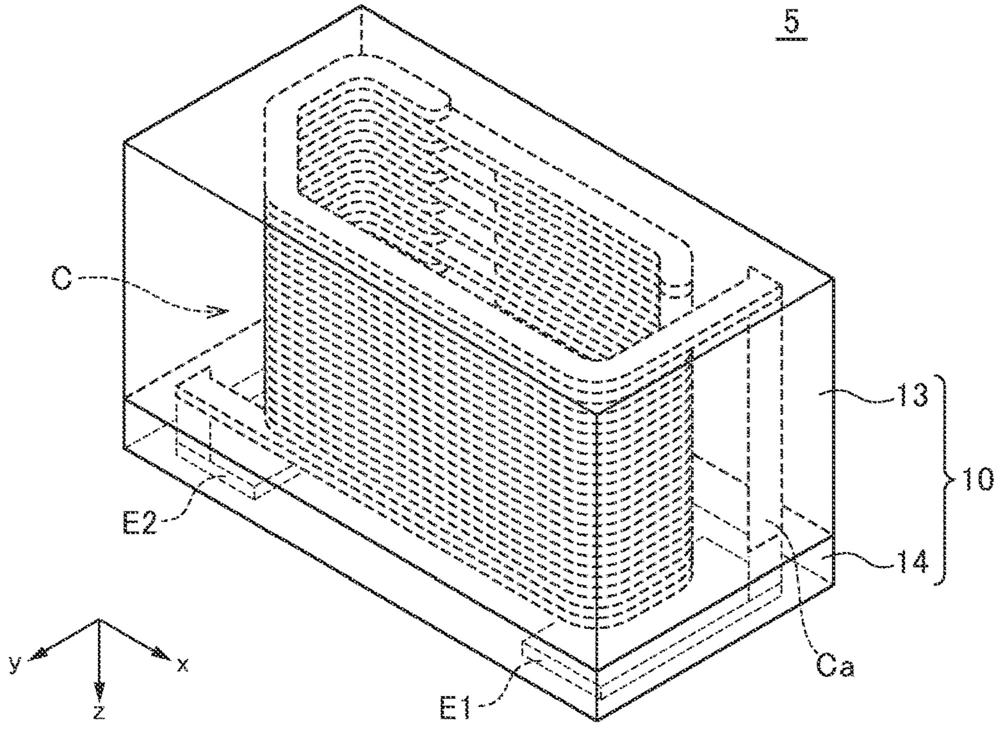
FIGS. 15A and 15B are schematic transparent perspective views for explaining the configuration of a coil component 5 according to a fifth embodiment of the present invention, where
Figure 15B:
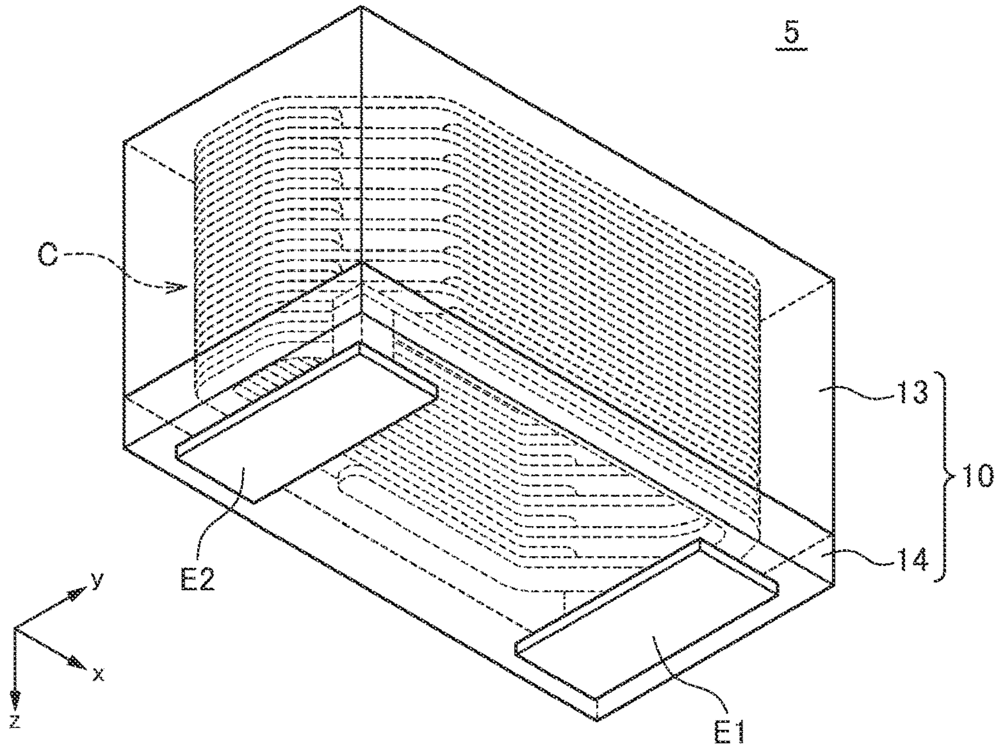

FIGS. 15A and 15B are schematic transparent perspective views for explaining the configuration of a coil component 5 according to a fifth embodiment of the present invention. FIG. 15A is a view as viewed from the top surface side, and FIG. 15B is a view as viewed from the mounting surface side.

As illustrated in FIGS. 15A and 15B, the coil component 5 according to the fifth embodiment differs from the coil component 4 according to the fourth embodiment in that the resin layer 12 is omitted. Other configurations are the same as those of the coil component 4 according to the fourth embodiment, so the same reference numerals are given to the same elements, and overlapping description will be omitted. As exemplified by the coil component 5 according to the fifth embodiment, the entire coil pattern C may be embedded in the resin layer 13, and the resin layer 14 having a low relative permittivity may be disposed only between the terminal electrodes E1, E2 and the first turn of the coil pattern C.

It is apparent that the present disclosure is not limited to the above embodiments, but may be modified and changed without departing from the scope and spirit of the disclosure.

For example, in the above embodiments, the resin-based insulating material constituting the resin layers 11 and 13 is added with filler, while the resin-based insulating material constituting the resin layers 12 and 14 is added with no filler; however, this is not essential in the present invention. Further, the same resin material may be used for the resin layers 11, 13 and resin layers 12, 14 with filter added to the resin layers 11, 13 so as to enhance strength and with no filer added to the resin layers 12, 14 so as not to increase the relative permittivity.

What is claimed is:

1. A coil component comprising:

a resin body having a first resin-based insulating material and a second resin-based insulating material lower in relative permittivity than the first resin-based insulating material;

a coil pattern embedded in the resin body and helically wound in a plurality of turns; and first and second terminal electrodes formed on a surface of the resin body and connected respectively to one and other ends of the coil pattern, wherein the coil pattern has a part covered with the first resin-based insulating material and another part covered with the second resin-based insulating material, wherein the second resin-based insulating material is provided between the first and second terminal electrodes and the coil pattern, and the first resin-based insulating material is not provided therebetween, wherein the first and second terminal electrodes are arranged in an axial direction of the coil pattern, wherein the first and second terminal electrodes are formed on the surface of the resin body parallel to the axial direction without being formed on another surface thereof perpendicular to the axial direction, wherein the resin body includes a first resin layer, a second resin layer formed on a surface of the first resin layer, and a third resin layer formed on a surface of the second resin layer, wherein the first and third resin layers are made of the first resin-based insulating material, and the second resin layer is made of the second resin-based insulating material, wherein the coil pattern includes:

a plurality of first horizontal sections provided on the surface of the first resin layer and embedded in the second resin layer;

a plurality of second horizontal sections provided on a surface of the third resin layer;

a plurality of first vertical sections penetrating the second and third resin layers and connecting each of one ends of the plurality of first horizontal sections to each of one ends of the plurality of second horizontal sections; and a plurality of second vertical sections penetrating the second and third resin layers and connecting each of other ends of the plurality of first horizontal sections to each of other ends of the plurality of second horizontal sections, wherein the resin body further includes a fourth resin layer formed on the surface of the third resin layer, wherein the first and second terminal electrodes are provided on the fourth resin layer, and wherein the fourth resin layer is made of the second resin-based insulating material.

2. The coil component as claimed in claim 1, wherein the second resin-based insulating material is provided between adjacent turns of the coil pattern.

3. The coil component as claimed in claim 1, wherein a part of the third resin layer that embeds the first horizontal section therein is made of the second resin-based insulating material, and wherein a remaining part of the third resin layer is made of the first resin-based insulating material.

4. The coil component as claimed in claim 1, wherein the first resin-based insulating material is added with filler, and wherein the second resin-based insulating material is added with no filler.

5. A coil component comprising:

a first resin layer;

a plurality of first coil sections formed on the first resin layer;

a second resin layer formed on the first resin layer so as to embed therein the plurality of first coil sections;

a third resin layer formed on the second resin layer;

a plurality of second coil sections formed on the third resin layer;

a fourth resin layer formed on the third resin layer so as to embed therein the plurality of second coil sections;

a plurality of third coil sections each connected between one end of an associated one of the plurality of first coil sections and one end of an associated one of the plurality of second coil sections;

a plurality of fourth coil sections each connected between other end of an associated one of the plurality of first coil sections and other end of an associated one of the plurality of second coil sections; and a terminal electrode formed on the fourth resin layer and connected to a predetermined one of the plurality of second coil sections, wherein the fourth resin layer is lower in relative permittivity than the third resin layer, and wherein no resin layer having relative permittivity higher than that of the fourth resin layer is present between the plurality of the second coil sections and the terminal electrode.

6. The coil component as claimed in claim 5, wherein the fourth resin layer is lower in relative permittivity than the first resin layer.

7. The coil component as claimed in claim 5, wherein the third resin layer is thicker than the fourth resin layer.

8. The coil component as claimed in claim 7, wherein a thickness of the third resin layer is more than three times a thickness of the fourth resin layer.

9. The coil component as claimed in claim 5, wherein the second resin layer is lower in relative permittivity than the third resin layer.

10. The coil component as claimed in claim 5, wherein the second resin layer is lower in relative permittivity than the first resin layer.

* * * * *